United States Patent [19]
Faigle et al.

[11] Patent Number: 5,695,214
[45] Date of Patent: Dec. 9, 1997

[54] AIR BAG MODULE WITH VENT

[75] Inventors: Ernst M. Faigle, Dryden; Tracy S. Sparks, Lapeer; Richard J. Thompson, Imlay City, all of Mich.

[73] Assignee: TRW Vehicle Safety Systems Inc., Lyndhurst, Ohio

[21] Appl. No.: 597,283

[22] Filed: Feb. 6, 1996

[51] Int. Cl.⁶ ............................................. B60R 21/26
[52] U.S. Cl. ...................... 280/735; 280/736; 280/739; 137/68.13
[58] Field of Search ............................ 280/739, 738, 280/735, 736, 742, 740, 732, 728.1; 137/68.13

[56] References Cited

U.S. PATENT DOCUMENTS

| | | | |
|---|---|---|---|
| 2,834,609 | 5/1958 | Bertrand | 280/739 |
| 3,758,133 | 9/1973 | Okada | 280/739 |
| 3,861,712 | 1/1975 | Matsui et al. | 280/735 |
| 3,910,595 | 10/1975 | Katter et al. | 280/738 |
| 3,930,664 | 1/1976 | Parr et al. | 280/738 |
| 5,221,109 | 6/1993 | Marchant | 280/736 |
| 5,366,242 | 11/1994 | Faigle et al. | 280/736 |

FOREIGN PATENT DOCUMENTS

| | | | |
|---|---|---|---|
| 896312 | 10/1953 | Germany | 280/732 |
| 3-32957 | 2/1991 | Japan | 280/739 |
| 90/09908 | 9/1990 | WIPO | 280/739 |

Primary Examiner—Brian L. Johnson
Assistant Examiner—Peter C. English
Attorney, Agent, or Firm—Tarolli, Sundheim, Covell, Tummino & Szabo

[57] ABSTRACT

An air bag module (12) includes an inflator (18) that is actuatable to supply inflation fluid to inflate an inflatable vehicle occupant protection device (16). A housing (14) directs the inflation fluid from the inflator (18) toward the inflatable device (16). At least one vent opening (40) is formed in the housing (14) for selectively venting inflation fluid from the housing. A door panel (70) is movable between a closed position blocking venting of inflation fluid from the housing (14) and an open position enabling venting of inflation fluid from the housing. The door panel (70), when in the closed position, is biased toward the open position. In one embodiment, the door panel (70) is resiliently deformable. In another embodiment, a spring (71a) is connected with a door (70a) and biases the door toward the open position.

24 Claims, 3 Drawing Sheets

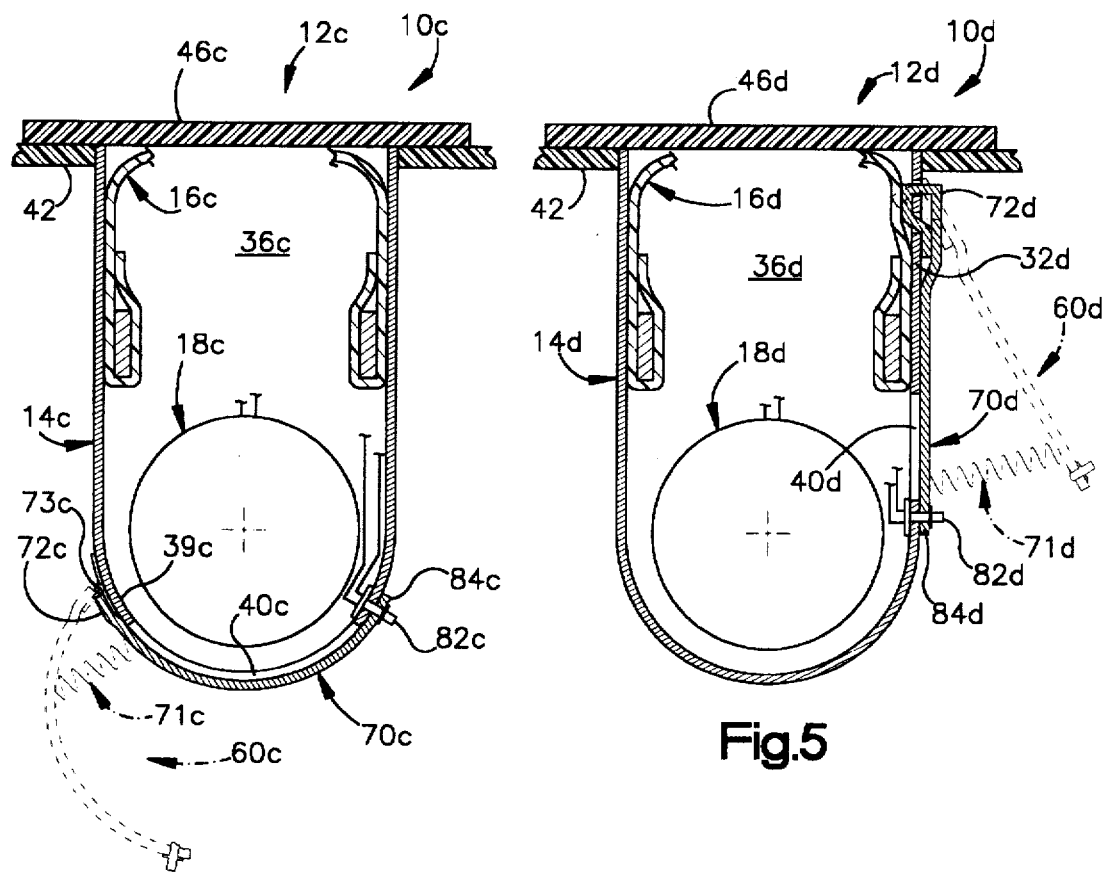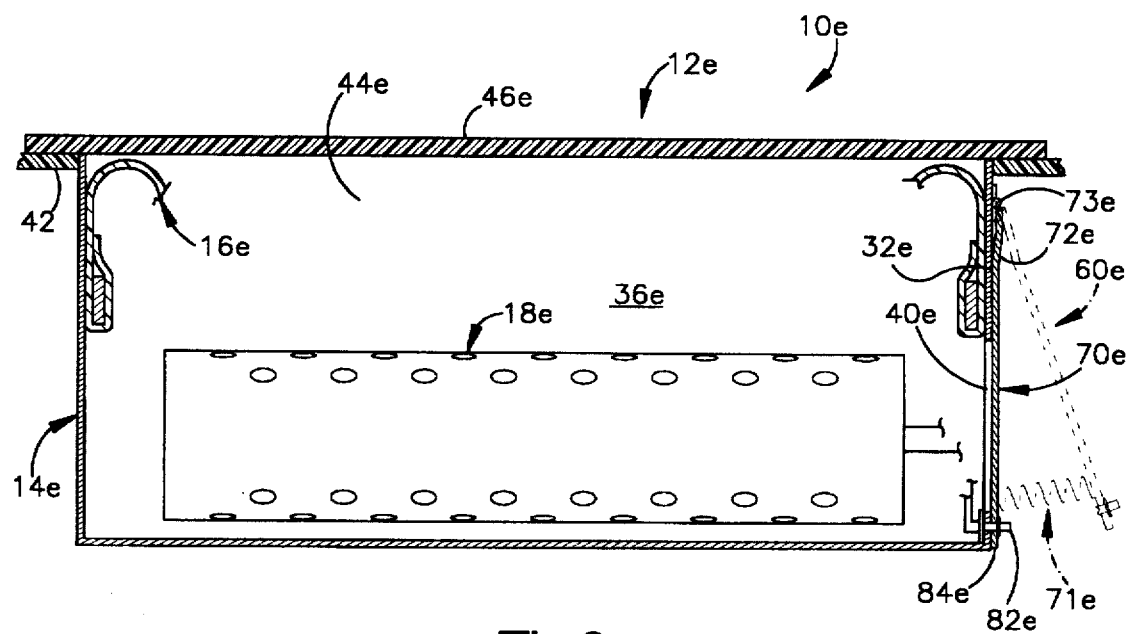

AIR BAG MODULE WITH VENT

BACKGROUND OF THE INVENTION

1. Technical Field

The present invention relates to a vehicle occupant safety apparatus including an inflatable vehicle occupant protection device, such as an air bag. In particular, the present invention relates to an air bag module in which inflation fluid is selectively vented from a housing of the module in order to control the speed and force of deployment of the air bag.

2. Description of the Prior Art

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant safety apparatus which includes an inflatable vehicle occupant protection device having a deflated condition and an inflated condition for helping to protect a vehicle occupant. An inflation fluid source is actuatable to provide inflation fluid to inflate the inflatable device from the deflated condition to the inflated condition. The safety apparatus includes a housing having walls for directing inflation fluid from the inflation fluid source toward the inflatable device. The apparatus includes means for defining a vent opening in the housing for selectively venting inflation fluid from the housing. Closure means for closing the vent opening comprises a door movable between a closed position blocking venting of inflation fluid from the housing and an open position enabling venting of inflation fluid from the housing. The door, when in the closed position, is biased toward the open position.

In one embodiment of the invention, the door comprises a resiliently deformable door panel. The door panel is resiliently biased toward the open position. In another embodiment of the invention, the closure means includes a spring connected with the door and biasing the door toward the open position.

In a further embodiment of the invention, the door is biased toward the closed position. This bias can help to resist backflow of inflation fluid from the air bag through the vent opening, when the air bag is loaded by contact with a vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a schematic illustration, partially in section, of a vehicle occupant safety apparatus constructed in accordance with a fourth embodiment of the present invention;

FIG. 5 is a schematic illustration, partially in section, of a vehicle occupant safety apparatus constructed in accordance with a fifth embodiment of the present invention; and FIG. 6 is a schematic illustration, partially in section, of a vehicle occupant safety apparatus constructed in accordance with a sixth embodiment of the present invention.

DESCRIPTION OF PREFERRED EMBODIMENTS

The present invention relates to a vehicle occupant safety apparatus including an inflatable vehicle occupant protection device, such as an air bag. In particular, the present invention relates to an air bag module in which inflation fluid is selectively vented from a housing of the module in order to control the speed and force of deployment of the inflating air bag.

Figure 1:
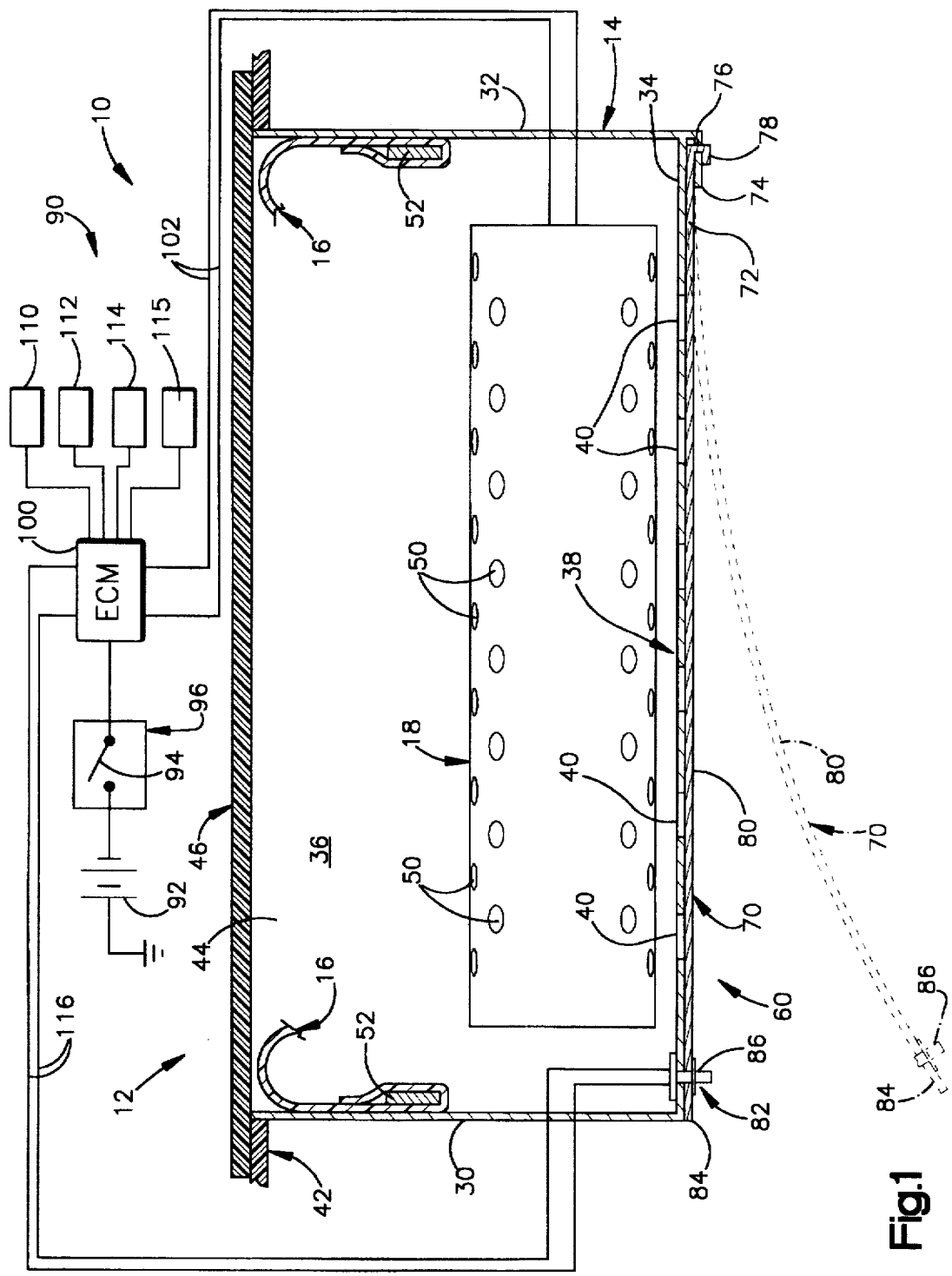
FIG. 1 is a schematic illustration, partially in section, of a vehicle occupant safety apparatus constructed in accordance with a first embodiment of the present invention.

As representative of the present invention, FIG. 1 illustrates a vehicle occupant safety apparatus 10 which is constructed in accordance with a first embodiment of the present invention. The safety apparatus 10 includes an inflatable vehicle occupant protection device 16 of the type commonly known as an air bag. The air bag 16 forms a part of an air bag module indicated generally at 12. The air bag module 12 also includes a housing 14 and an inflator 18.

The housing 14 is a box-like metal structure having a plurality of walls including first and second opposite side walls 30 and 32 and a back wall 34. The air bag 16 is secured to the side walls 30 and 32 of the housing 14 by a retainer or retaining ring 52. The walls of the housing 14, including the side walls 30 and 32 and the back wall 34, define a chamber 36 in the housing. A vent 38 is formed in the back wall 34 of the housing 14. In the illustrated embodiment, the vent 38 comprises a plurality of spaced apart vent openings 40 which extend through the back wall 34 of the housing 14.

The housing 14 is mounted in a vehicle instrument panel 42 in a known manner (not shown). The back wall 34 is oriented toward the front of the vehicle in which the air bag module 12 is mounted. A deployment opening 44 is defined between the side walls 30 and 32 of the housing 14. The deployment opening 44 is oriented generally toward the rear of the vehicle in which the air bag module 12 is mounted, that is, toward an occupant of the vehicle. A deployment door or cover 46, which may form a portion of the vehicle instrument panel 42, closes the deployment opening 44 when the air bag 16 is in the deflated condition. Although the housing 14 is shown as a separate structure which is mounted in the instrument panel 42, such a housing could alternatively be defined by the structure of the instrument panel, or by another part of the vehicle from which the air bag 16 is to be inflated to help protect the vehicle occupant.

The inflator 18 is mounted in the chamber 36 of the housing 14 in a known manner (not shown). The inflator 18 comprises a source of inflation fluid for inflating the air bag 16. As known in the art, the inflator 18 may contain an ignitable gas-generating material which, when ignited, rapidly generates a large volume of gas. The inflator 18 may alternatively contain a stored quantity of pressurized inflation fluid, or a combination of pressurized inflation fluid and ignitable material for heating the inflation fluid. The inflator 18 has a plurality of fluid outlet openings 50 through which inflation fluid is directed into the chamber 36 in the housing 14 upon actuation of the inflator.

The air bag module 12 includes a closure assembly 60 for selectively covering the vent openings 40. The closure assembly 60 includes a door panel 70. The door panel 70 is resiliently deformable between an open position as shown in dot-dash lines in FIG. 1 and a closed position as shown in solid lines in FIG. 1. The door panel 70 is biased toward the open position, that is, toward the free state of the door panel, by the inherent resilience of the material from which the door panel is made. In the embodiment illustrated in FIG. 1, the door panel 70 is made of spring steel. It should be understood that the door panel 70 could be made of another resiliently deformable material, such as plastic.

An inner end portion 72 of the door panel 70 includes a hook portion 78 which extends through an opening 76 in a flange portion 74 of the housing 14. The hook portion 78 of the door panel 70 hingedly attaches the door panel to the housing 14. The door panel 70 includes an intermediate portion 80 which, when the door panel is in the closed position illustrated in solid lines in FIG. 1, overlies and covers the vent openings 40 in the back wall 34 of housing 14.

When the door panel 70 is in the closed position, a pyrotechnic fastener indicated schematically at 82 secures an outer end portion 84 of the door panel to the housing 14. The pyrotechnic fastener 82 is a known, commercially available product, and is preferably an explosive rivet or explosive bolt. A portion 86 of the pyrotechnic fastener 82 is disposed outside of the door panel 70. The pyrotechnic fastener 82 normally holds the door panel 70 in the closed position against the bias of the door panel. The door panel 70, when in the closed position, blocks venting of inflation fluid through the vent openings 40.

The vehicle safety apparatus 10 also includes vehicle electric circuitry indicated schematically at 90. The vehicle electric circuitry 90 includes a power source 92, which is preferably the vehicle battery and/or a capacitor, and a normally open switch 94. The switch 94 is part of a sensor 96 which senses a condition indicating the occurrence of a vehicle collision. The collision-indicating condition may comprise, for example, sudden vehicle deceleration caused by a collision. The vehicle electric circuitry 90 also includes an electronic control module 100. The vehicle electric circuitry 90 further includes a plurality of vehicle condition and/or occupant condition sensors, such as an occupant position sensor 110, an occupant size sensor 112, a module temperature sensor 114, and a crash severity sensor 115.

If the collision-indicating condition sensed by the sensor 96 is above a predetermined threshold, it indicates the occurrence of a collision for which inflation of the air bag 16 is desired to help protect the occupant of the vehicle. The sensor 96 then closes the switch 94, and the control module 100 sends an actuation signal to the inflator 18 over lead wires 102. When the inflator 18 is actuated, it emits a large volume of inflation fluid into the chamber 36 in the housing 14. The housing 14 directs the inflation fluid from the inflator 18 into the air bag 16 to inflate the air bag. As the inflation fluid begins to inflate the air bag 16, the air bag moves rapidly outward and forcefully against the deployment door 46. The inflating air bag 16 moves the deployment door 46 outward and the air bag inflates through the deployment opening 44 into a position to help protect the vehicle occupant.

The control module 100 looks at the signals from the sensors 110, 112, 114, and 115 to determine whether it is desirable to open the door panel 70 upon the occurrence of a condition requiring actuation of the inflator. This determination, as well as the opening of the door panel 70 itself, can be made prior to actuation of the inflator 18, or at the same time as actuation of the inflator, or after actuation of the inflator.

If, for example, the signal from the occupant position sensor 110 indicates that the vehicle occupant is closer than a predetermined distance to the air bag module 12, then the control module 100 determines that the door panel 70 should be opened to vent inflation fluid from the housing 14 in order to reduce the speed and force of the inflating air bag 16. In a similar manner, if the signal from the occupant size sensor 112 indicates that the vehicle occupant is smaller than a predetermined size, then the control module 100 determines that the door panel 70 should be opened. Further, if the signal from the temperature sensor 114 indicates that the ambient temperature at the air bag module 12 is above a predetermined temperature, then the control module 100 determines that the door panel 70 should be opened. The output from the crash severity sensor 115 also is looked at to determine whether the vehicle condition is such that inflation fluid should be vented from the housing 14.

In the event that the control module 100 determines that the door panel 70 should be opened, a control signal is sent from the control module 100, through lead wires 116, to the pyrotechnic fastener 82. The pyrotechnic fastener 82 is actuated and releases the outer end portion 84 of the door panel 70. The door panel 70 moves, due to the bias of the material from which it is made, from the closed position shown in solid lines in FIG. 1 to the open position shown in dot-dash lines in FIG. 1.

When the door panel 70 moves from the closed position to the open position, the vent openings 40 in the back wall 34 of the housing 14 are uncovered. The uncovering of the vent openings 40 enables inflation fluid from the inflator 18 to flow out of the chamber 36 through the vent openings 40. The inflation fluid which flows out of the chamber 36 through the vent openings 40 does not flow into the air bag 16 to inflate the air bag. As a result, the amount of inflation fluid flowing into the air bag 16, or the pressure of the inflation fluid, is reduced as compared to the amount or pressure of inflation fluid flowing into the air bag when the vent openings 40 remain covered by the closed door panel 70. This change in the flow of inflation fluid can help to reduce or control the speed and force of deployment of the air bag 16.

The opening of the door panel 70 is primarily caused by pressure of the inflation fluid in the chamber 36 acting outward upon the door panel through the vent openings 40. In addition, the pyrotechnic fastener 82 may be of the type which, when actuated, urges the outer end portion 84 of the door panel 70 in a direction away from the back wall 34 of the housing 14, to assist in opening the door panel.

The resilience or bias of the door panel 70 also can increase the speed with which the vent openings 40 are uncovered. This can be important in ensuring that inflation fluid is vented as desired and that the air bag 16 is, consequently, inflated with the desired amount of speed and force dependent upon the conditions sensed by the sensors 110, 112, 114 and 115. The resilience or bias of the door panel 70 also directs the door panel to move in the proper direction when released and, further, helps to prevent noise caused by rattling movement of the door panel.

It should be understood that the vehicle condition and occupant condition sensors which control actuation of the pyrotechnic fastener 82 can sense conditions other than occupant position, occupant size, crash severity, and module temperature. For example, a vehicle condition sensor might sense the presence of a rearward-facing child seat, and the control module 100 could then determine that all or substantially all of the inflation fluid from the inflator should be vented from the housing 14 rather than directed into the air bag 16.

It should be understood that the control module 100 can determine not only whether, but also when, inflation fluid from the inflator should be vented from the housing 14. For example, it may be desirable to open the door panel of the housing 14 at a time either before or after the time of actuation of the inflator 18. Electronic control modules which are capable of controlling the time of actuation of the pyrotechnic fastener 82, as well as the actuation itself, in response to the signals from the condition sensors, are known. Also, other types of holding and release means can be used in place of the pyrotechnic fastener 82. For example, an electrically actuatable solenoid can be used to hold and release a movable door panel.

Figure 2:
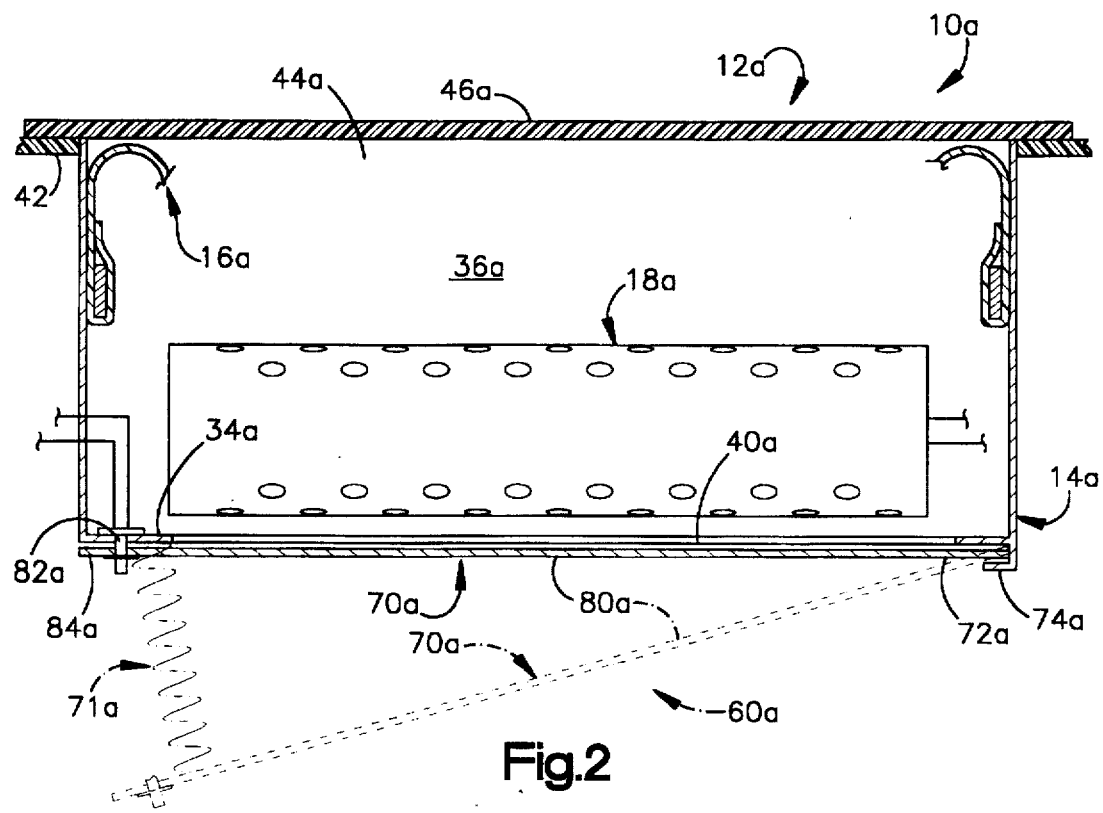
FIG. 2 is a schematic illustration, partially in section, of a vehicle occupant safety apparatus constructed in accordance with a second embodiment of the present invention.

FIG. 2 illustrates schematically a vehicle safety apparatus 10a including an air bag module 12a which is constructed in accordance with a second embodiment of the present invention. The air bag module 12a is generally similar to the vehicle air bag module 12 (FIG. 1), and similar parts of the module 12a are given similar reference numerals with the suffix "a" added.

The module 12a includes a closure assembly 60a which includes a door 70a and a spring indicated schematically at 71a. The door 70a is preferably made from sheet metal, such as steel or aluminum, but can also be made from plastic. An inner end portion 72a of the door 70a is slidably received in a flange portion 74a of the housing 14a. An intermediate portion 80a of the door 70a covers a vent opening 40a when the door is in a closed position as shown in solid lines in FIG. 2. An outer end portion 84a of the door 70a is secured by a pyrotechnic fastener 82a to a back wall 34a of the housing 14a. The door 70a is rigid and does not deform when it moves between the open and closed positions.

The spring 71a is connected between and extends in a force-transmitting relationship between the outer end portion 84a of the door 70a and the back wall 34a of the housing 14a. The spring 71a biases the door 70a into an open position as shown in dot-dash lines in FIG. 2. The spring 71a is loaded in compression when the door 70a is in the closed position shown in solid lines in FIG. 2. The spring 71a may be of any suitable construction, including a cylindrical helical spring of circular cross-sectional configuration.

The pyrotechnic fastener 82a is actuatable in the same manner, and under the same circumstances, as the pyrotechnic fastener 82 (FIG. 1). Upon actuation, the pyrotechnic fastener 82a releases the outer end portion 84a of the door 70a. The door 70a moves, due to the bias of the spring 71a, from the closed position shown in solid lines in FIG. 2 to the open position shown in dot-dash lines in FIG. 2. When the door 70a moves to the open position, the vent opening 40a is uncovered. When the vent opening 40a is uncovered, inflation fluid can be vented from the chamber 36a in the housing 14a through the vent opening.

The inner end portion 72a of the door 70a and the flange portion 74a of the housing 14a are configured so that the door can disengage from the housing rather than staying attached to the housing, if sufficient space is available adjacent to the door. This capability can decrease the time needed to uncover fully the vent opening 40a, thus increasing the speed with which inflation fluid is vented from the housing 14a.

It should be understood that the illustration of the configuration and placement and attachment of the spring 71a is only schematic and exemplary. The spring 71a can be of any suitable configuration and can be connected at any suitable location and manner so as to bias the door 70a into the open position.

Figure 3:
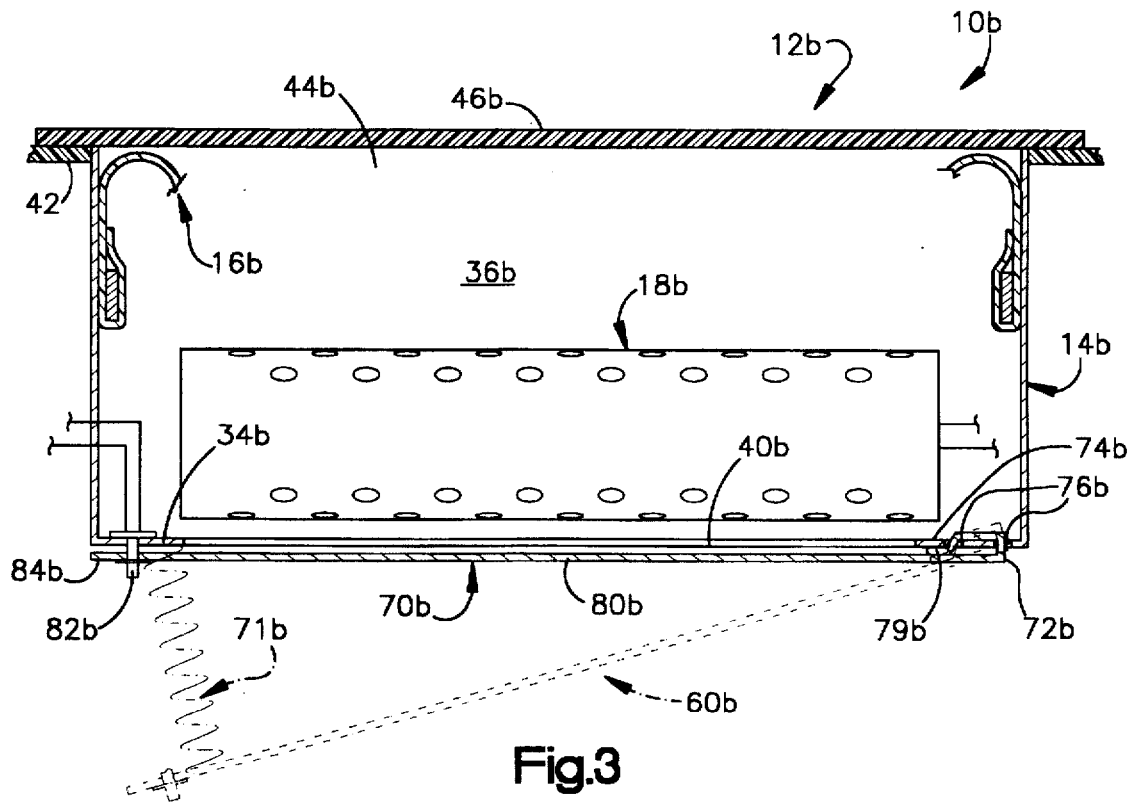
FIG. 3 is a schematic illustration, partially in section, of a vehicle occupant safety apparatus constructed in accordance with a third embodiment of the present invention.

FIG. 3 illustrates schematically a vehicle safety apparatus 10b including an air bag module 12b which is constructed in accordance with a third embodiment of the present invention. The air bag module 12b is generally similar to the air bag module 12a (FIG. 2), and similar parts of the module 12b are given similar reference numerals using the suffix "b".

The air bag module 12b includes a closure assembly 60b which includes a door 70b and a spring indicated schematically at 71b. The door 70b is similar in construction to the door 70a (FIG. 2) but has an inner end portion 72b which is hingedly connected with a flange portion 74b of the housing 14b. The inner end portion 72b of the door 70b is formed in a loop that extends through a pair of spaced openings 76b in the back wall 34b of the housing 14b. The inner end portion 72b has a terminal portion 79b which closes the loop in the inner end portion and which lies in a plane between the plane of the back wall 34b of the housing 14b and the plane of the door 70b.

The spring 71b biases the door 70b into an open position as shown in dot-dash lines in FIG. 3. A pyrotechnic fastener 82b is actuatable in the same manner, and under the same circumstances, as the pyrotechnic fastener 82 (FIG. 1) to release the outer end portion 84b of the door 70b. The door 70b moves, due to the bias of the spring 71b, from the closed position shown in solid lines in FIG. 3 to the open position shown in dot-dash lines in FIG. 3. When the door 70b moves to the open position, the vent opening 40b is uncovered. When the vent opening 40b is uncovered, inflation fluid can be vented from the chamber 36b in the housing 14b through the vent opening. The inner end portion 72b of the door 70b remains connected with the housing 14b.

FIG. 4 illustrates schematically a vehicle safety apparatus 10c including an air bag module 12c which is constructed in accordance with a fourth embodiment of the present invention. The air bag module 12c is generally similar to the air bag module 12b (FIG. 3), and similar parts of the module 12c are given similar reference numerals using the suffix "c".

The air bag module 12c includes a closure assembly 60c which includes a door 70c and a spring indicated schematically at 71c. The door 70c has an inner end portion 72c which is connected by a hinge 73c with the housing 14c. The door 70c has an arcuate cross-sectional configuration and covers a vent opening 40c in a cylindrical lower section or bottom wall 39c of the housing 14c.

The spring 71c biases the door 70c into an open position as shown in dot-dash lines in FIG. 4. A pyrotechnic fastener 82c is actuatable in the same manner, and under the same circumstances, as the pyrotechnic fastener 82 (FIG. 1) to release the outer end portion 84c of the door 70c. The door 70c moves, due to the bias of the spring 71c, from the closed position shown in solid lines in FIG. 4 to the open position shown in dot-dash lines in FIG. 4. When the door 70c moves to the open position, the vent opening 40c is uncovered. When the vent opening 40c is uncovered, inflation fluid can be vented from the chamber 36c in the housing 14c through the vent opening.

FIG. 5 illustrates schematically a vehicle safety apparatus 10d including an air bag module 12d which is constructed in accordance with a fifth embodiment of the present invention. The air bag module 12d is generally similar to the air bag module 12c (FIG. 4), and similar parts of the module 12d are given similar reference numerals using the suffix "d".

The air bag module 12d includes a closure assembly 60d which includes a door 70d and a spring indicated schematically at 71d. The door 70d has an inner end portion 72d which is connected with a side wall 32d of the housing 14d. The door 70d has a generally planar configuration and covers a vent opening 40d in the generally planar side wall 32d of the housing 14d.

The spring 71d biases the door 70d into an open position as shown in dot-dash lines in FIG. 5. A pyrotechnic fastener 82d is actuatable in the same manner, and under the same circumstances, as the pyrotechnic fastener 82 (FIG. 1) to release the outer end portion 84d of the door 70d. The door 70d moves, due to the bias of the spring 71d, from the closed position shown in solid lines in FIG. 5 to the open position shown in dot-dash lines in FIG. 5. When the door 70d moves to the open position, the vent opening 40d is uncovered. When the vent opening 40d is uncovered, inflation fluid can be vented from the chamber 36d in the housing 14d through the vent opening.

FIG. 6 illustrates schematically a vehicle safety apparatus 10e including an air bag module 12e which is constructed in accordance with a sixth embodiment of the present invention. The air bag module 12e includes a closure assembly 60e which includes a door 70e and a spring indicated schematically at 71e. The door 70e has an inner end portion 72e which is connected by a hinge 73e with the housing 14e. The door 70e has a generally planar configuration and covers a vent opening 40e in an end wall 32e of the housing 14e.

The spring 71e biases the door 70e into an open position as shown in dot-dash lines in FIG. 6. A pyrotechnic fastener 82e is actuatable in the same manner, and under the same circumstances, as the pyrotechnic fastener 82 (FIG. 1) to release the outer end portion 84e of the door 70e. The door 70e moves, due to the bias of the spring 71e, from the closed position shown in solid lines in FIG. 6 to the open position shown in dot-dash lines in FIG. 6. When the door 70e moves to the open position, the vent opening 40e is uncovered. When the vent opening 40e is uncovered, inflation fluid can be vented from the chamber 36e in the housing 14e through the vent opening.

When a vehicle occupant contacts an inflated air bag, such as the air bag 16a (FIG. 2), the inflation fluid in the air bag can tend to be forced out of the air bag through the inflation fluid opening in the air bag. The inflation fluid can flow from the air bag into the housing. If the housing includes a vent opening, such as the vent opening 40a, which is uncovered or open, the inflation fluid can flow out of the housing. This backflow of inflation fluid from the air bag and the housing can reduce the cushioning effect of the air bag.

In accordance with a further embodiment of the present invention, a door panel which covers a vent opening in the housing of an air bag module may be biased toward the closed position rather than toward the open position. For example, the closure assembly 60a (FIG. 2) may be constructed so that the spring 71a urges the door panel 70a to move from the open position shown in dot-dash lines in FIG. 2 toward the closed position shown in solid lines in FIG. 2. The spring 71a would thereby resist movement of the door panel 70a from the closed position shown in solid lines in FIG. 2 toward the open position shown in dot-dash lines in FIG. 2.

The spring 71a, as thus configured, would not be strong enough to block movement of the door panel 70a from the closed position to the open position upon actuation of the inflator 18a. The pressure in the chamber 36a in the housing 14a is initially relatively high upon actuation of the inflator 18a. This high pressure would overcome the biasing effect of the spring 71a and would, as desired, uncover the vent opening 40a in the housing 14a upon actuation of the pyrotechnic fastener 82a.

After the deployment door 46a opens and the air bag 16a begins to inflate, the pressure in the chamber 36a drops substantially. The pressure in the chamber 36a may drop to a level at which the biasing force of the spring 71a can move the door panel 70a from the open position shown in dot-dash lines in FIG. 2 toward the closed position shown in solid lines in FIG. 2. This closing movement of the door panel 70a can help to block the backflow of inflation fluid out of the housing 14a and, thereby, out of the air bag 16a.

It should be understood that an air bag module which includes either a spring-biased door panel, such as the door panel 70a (FIG. 2), or a resilient door panel, such as the door panel 70 (FIG. 1), can be constructed so that the door panel is biased toward the closed position. If a resilient door panel, such as the door panel 70 (FIG. 1), is used, then the resilience or bias of the door panel would tend to bias the door panel toward the closed position. This bias would, upon actuation of the inflator, be overcome by the pressure of the inflation fluid in the housing.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus comprising:

an inflatable vehicle occupant protection device having a deflated condition and an inflated condition for helping to protect a vehicle occupant;

an inflation fluid source actuatable to provide inflation fluid to inflate said inflatable device from the deflated condition to the inflated condition;

a housing having walls for directing inflation fluid from said inflation fluid source toward said inflatable device upon actuation of said inflation fluid source;

means for defining a vent opening in said housing for selectively venting inflation fluid from said housing; and closure means for closing said vent opening, said closure means comprising a door movable between a closed position blocking venting of inflation fluid from said housing and an open position enabling venting of inflation fluid from said housing, said door when in the closed position being biased toward the open position;

said door comprising a resiliently deformable door panel movable between the closed position covering said vent opening and the open position enabling venting of inflation fluid from said housing, said door panel being resiliently deformed when in the closed position and being resiliently biased toward the open position, said closure means further comprising holding means for holding said door panel in the closed position, said door panel moving from the closed position to the open position at least partially due to the bias of said door panel.

2. An apparatus as set forth in claim 1 wherein said door panel is made from spring steel.

3. A vehicle occupant safety apparatus comprising:

an inflatable vehicle occupant protection device having a deflated condition and an inflated condition for helping to protect a vehicle occupant;

an inflation fluid source actuatable to provide inflation fluid to inflate said inflatable device from the deflated condition to the inflated condition;

a housing having walls for directing inflation fluid from said inflation fluid source toward said inflatable device upon actuation of said inflation fluid source;

means for defining a vent opening in said housing for selectively venting inflation fluid from said housing;

closure means for closing said vent opening, said closure means comprising a door movable between a closed position blocking venting of inflation fluid from said housing and an open position enabling venting of inflation fluid from said housing, said door when in the closed position being biased toward the open position; and vehicle electric circuitry for sensing at least one condition selected from the group consisting of occupant position, occupant size, temperature, and crash severity and for selectively providing a control signal for initiating opening of said door in response to the sensed condition.

4. A vehicle occupant safety apparatus comprising:

an inflatable vehicle occupant protection device having a deflated condition and an inflated condition for helping to protect a vehicle occupant;

an inflation fluid source actuatable to provide an amount of inflation fluid to inflate said inflatable device from the deflated condition to the inflated condition;

a housing having walls for directing inflation fluid from said inflation fluid source toward said inflatable device upon actuation of said inflation fluid source; and means for selectively controlling the amount of inflation fluid which flows into the inflatable vehicle occupant protection device by diverting fluid flowing from said inflation fluid source away from said inflatable vehicle occupant protection device, said means for selectively controlling comprising:

means for defining an opening in said housing for directing inflation fluid from said housing;

closure means for closing said opening, said closure means comprising a door movable between a closed position blocking flow of inflation fluid from said housing through said opening and an open position enabling flow of inflation fluid from said housing through said opening, said door when in the closed position being biased toward the open position; and actuatable means, actuatable to enable said door to move to the open position.

5. An apparatus as set forth in claim 4 wherein said door comprises a resiliently deformable door panel movable between the closed position covering said opening and the open position enabling directing of inflation fluid from said housing through said opening, said door panel being resiliently deformed when in the closed position and being resiliently biased toward the open position, said door panel moving from the closed position to the open position at least partially due to the bias of said door panel.

6. An apparatus as set forth in claim 5 wherein said door panel is made from spring steel.

7. An apparatus as set forth in claim 4 wherein said closure means further comprises a spring which is connected with said door and which biases said door toward the open position and holding means for holding said door in the closed position against the bias of said spring, said door moving from the closed position to the open position at least partially due to the bias of said spring.

8. An apparatus as set forth in claim 7 wherein said door is rigid and said spring is connected between a wall of said housing and an end portion of said door, said spring being loaded in compression when said door is in the closed position to bias said door toward the open position.

9. An apparatus as set forth in claim 4 further comprising vehicle electric circuitry for sensing at least one condition and for selectively providing a control signal for actuating said actuatable means in response to the sensed condition to initiate opening of said door.

10. An apparatus as set forth in claim 9 wherein said vehicle electric circuitry provides said control signal prior to actuation of said inflation fluid source.

11. An apparatus as set forth in claim 9 wherein said vehicle electric circuitry provides said control signal at the time of actuation of said inflation fluid source.

12. An apparatus as set forth in claim 9 wherein said vehicle electric circuitry provides said control signal after actuation of said inflation fluid source.

13. An apparatus as set forth in claim 9 wherein said at least one condition is selected from the group consisting of occupant position, occupant size, temperature, and crash severity.

14. An apparatus as set forth in claim 4 wherein said actuatable means comprises an electrically actuatable pyrotechnic fastener for holding said door in the closed position, said pyrotechnic fastener being electrically actuatable to release said door for movement from the closed position to the open position.

15. An apparatus as set forth in claim 4 wherein said actuatable means comprises an electrically actuatable device for holding said door in the closed position and for, when actuated, urging said door to move from the closed position toward the open position.

16. An apparatus as set forth in claim 4 further comprising hinge means for connecting said door with said housing walls when said door is in the closed position and for retaining said door connected with said housing when said door is in the open position.

17. An apparatus as set forth in claim 4 wherein said opening is formed in a back wall of said housing.

18. An apparatus as set forth in claim 4 wherein said opening is formed in a bottom wall of said housing.

19. An apparatus as set forth in claim 4 wherein said opening is formed in a side wall of said housing.

20. An apparatus as set forth in claim 4 wherein said opening is formed in an end wall of said housing.

21. A vehicle occupant safety apparatus comprising:

an inflatable vehicle occupant protection device having a deflated condition and an inflated condition for helping to protect a vehicle occupant;

an inflation fluid source actuatable to provide an amount of inflation fluid to inflate said inflatable device from the deflated condition to the inflated condition;

a housing having walls for directing inflation fluid from said inflation fluid source toward said inflatable device upon actuation of said inflation fluid source; and means for selectively controlling the amount of inflation fluid which flows into the inflatable vehicle occupant protection device by diverting fluid flowing from said inflation fluid source away from said inflatable vehicle occupant protection device, said means for selectively controlling comprising:

means for defining an opening in said housing for directing inflation fluid from said housing;

closure means for closing said opening, said closure means comprising a door movable due to the pressure of inflation fluid in said housing between a closed position blocking flow of inflation fluid from said housing through said opening and an open position enabling flow of inflation fluid from said housing through said opening, said door when in the open position being biased toward the closed position; and actuatable means, actuatable to enable said door to move to the open position.

22. An apparatus as set forth in claim 21 wherein said door comprises a resiliently deformable door panel movable between the closed position covering said opening and the open position enabling directing of inflation fluid from said housing through said opening, said door panel being resiliently deformed when in the open position and being resiliently biased toward the closed position, said door panel being movable from the closed position to the open position due to the pressure of inflation fluid in said housing against the bias of said door panel.

23. An apparatus as set forth in claim 21 wherein said closure means further comprises a spring which is connected with said door and which biases said door toward the closed position, said door being movable from the closed position to the open position due to the pressure of inflation fluid in said housing against the bias of said spring.

24. An apparatus as set forth in claim 21 further comprising vehicle electric circuitry for sensing at least one condition and for selectively providing a control signal for actuating said actuatable means in response to the sensed condition to initiate opening of said door, said at least one condition being selected from the group consisting of occupant position, occupant size, temperature, and crash severity.

* * * * *